US009207758B2

(12) United States Patent
Cernasov et al.

(10) Patent No.: US 9,207,758 B2
(45) Date of Patent: Dec. 8, 2015

(54) OPERATOR ASSISTANCE METHODS AND SYSTEMS

(75) Inventors: Andrei Cernasov, Ringwood, NJ (US);
Robert Mead, Flemington, NJ (US);
Joseph Marotta, Boonton, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 1750 days.

(21) Appl. No.: 12/130,045

(22) Filed: May 30, 2008

(65) Prior Publication Data

US 2009/0325131 A1  Dec. 31, 2009

(51) Int. Cl.
*G06F 3/01* (2006.01)
*G09B 9/30* (2006.01)

(52) U.S. Cl.
CPC ............... *G06F 3/012* (2013.01); *G09B 9/307* (2013.01)

(58) Field of Classification Search
CPC ........................................................ G09B 9/307
USPC .................... 434/30, 35, 37, 43, 44; 345/7, 8
See application file for complete search history.

(56) References Cited

U.S. PATENT DOCUMENTS

| 4,554,545 | A | * | 11/1985 | Lowe ............................. 340/980 |
| 4,994,794 | A | * | 2/1991 | Price et al. ......................... 345/7 |
| 5,138,555 | A | * | 8/1992 | Albrecht ......................... 701/14 |
| 5,712,649 | A | * | 1/1998 | Tosaki ............................... 345/8 |
| 5,717,593 | A | * | 2/1998 | Gvili .............................. 701/207 |
| 5,742,264 | A | * | 4/1998 | Inagaki et al. ..................... 345/8 |
| 5,803,738 | A | * | 9/1998 | Latham ........................... 434/29 |
| 5,822,127 | A | * | 10/1998 | Chen et al. ..................... 359/631 |
| 5,831,584 | A | * | 11/1998 | Socks et al. ....................... 345/8 |
| 6,714,141 | B2 | * | 3/2004 | Kennedy ........................ 340/980 |
| 7,180,476 | B1 | * | 2/2007 | Guell et al. ....................... 345/7 |
| 7,181,478 | B1 | * | 2/2007 | Korson et al. ................. 707/667 |

(Continued)

FOREIGN PATENT DOCUMENTS

| WO | 9749081 | 12/1997 |
| WO | 0052563 | 9/2000 |

OTHER PUBLICATIONS

Ronald T. Azuma; A Survey of Augmented Reality, Presence, Cambridge, MA, US; Aug. 1, 1997, pp. 1-48, XP002254668.

(Continued)

*Primary Examiner* — Bruk Gebremichael
(74) *Attorney, Agent, or Firm* — Ingrassia Fisher & Lorenz, PC

(57) ABSTRACT

Embodiments include systems and methods for assisting an operator (e.g., a pilot) of an apparatus (e.g., an aircraft) that includes a control compartment (e.g., a cockpit). The system includes a near-eye display and a processing subsystem. The near-eye display includes a transparent display panel and is adapted to be worn on a head of the operator. The processing subsystem is adapted to receive layout information defining a physical layout of one or more operational components located within the control compartment. The processing subsystem is further adapted to determine a location for a display indicator on the transparent display panel, where the location is determined to appear to the operator to be in proximity to an operational component. The processing subsystem is further adapted to generate a display signal to cause the near-eye display to display the display indicator in the location.

26 Claims, 7 Drawing Sheets

(56) References Cited

U.S. PATENT DOCUMENTS

| | | | |
|---|---|---|---|
| 7,415,336 B1* | 8/2008 | Burch | 701/35 |
| 2006/0241792 A1* | 10/2006 | Pretlove et al. | 700/83 |
| 2008/0218434 A1* | 9/2008 | Kelly et al. | 345/8 |
| 2010/0141555 A1* | 6/2010 | Rorberg et al. | 345/8 |
| 2010/0231705 A1* | 9/2010 | Yahav et al. | 348/115 |

OTHER PUBLICATIONS

You S. et al.; Orientation Tracking for Outdoor Augmented Reality Registration, IEEE Computer Graphics and Applications, IEEE Service Center, New York, NY, US; vol. 19, No. 6; Nov. 1, 1998, pp. 36-42, XP008070350.

Azuma R. et al.; Tracking in Unprepared Environments for Augmented Reality Systems, Computers and Graphics, Elsevier, GB, vol. 23, No. 6; Dec. 1, 1999, pp. 787-793, XP004187823.

Azuma R. et al.; Recent Advances in Augmented Reality, IEEE Computer Graphics and Applications, IEEE Service Center, New York, NY, US, vol. 21, No. 6; Nov. 1, 2001, pp. 34-47, XP011093930.

Peters D., L.; Society for Information Display: Chasing the Eye: An Eye-Tracked Display for the Simulation Industry the How and the Why, SID International Symposium Digest of Technical Papers, Anaheim, May 6 19910506 Playa Del Rey, SID, US, vol. 22; May 6, 1991, pp. 495-497, XP000503077.

EP Search Report dated Nov. 12, 2009, EP 09161181.4-2221/2128842.

* cited by examiner

OPERATOR ASSISTANCE METHODS AND SYSTEMS

TECHNICAL FIELD

The embodiments generally relate to methods and systems for assisting an operator of an apparatus that includes a control compartment, and more particularly methods and systems for training a pilot of an airplane.

BACKGROUND

In the United States and elsewhere, governmental bodies such as the FAA (Federal Aviation Administration) require pilots and pilots-in-training to obtain various certifications in order to operate an aircraft. Each certification may relate to flying an aircraft of a specific category and class. The "category" on a pilot certificate refers to the broad classification of aircraft that the pilot is certified to fly. Categories of aircraft include, for example, fixed-wind airplane, rotorcraft, glider, lighter-than-air, powered-lift, powered parachute, and weight-shift-control aircraft. Some categories are further broken down into more specific classes of aircraft for which the pilot must obtain certification. In contrast, the "class" on a pilot certificate refers to the type of propulsion, and may further refer to whether the pilot is certified to fly over land or sea. For example, airplane class ratings include single-engine land, multi-engine land, single-engine sea, and multi-engine sea. Rotorcraft class ratings include helicopter and gyroplane.

In addition to receiving certifications for specific categories and classes of aircraft, certain types of aircraft also require the pilot to obtain a type rating. For example, a type rating may be required in a specific make and model of an airplane if the airplane is "large" (e.g., greater than 12,500 lb gross weight) or if the airplane is powered by one or more jet engines. As an example, a captain of a Boeing 747 flying domestically for a scheduled airline would be required to have a valid Airline Transport Pilot certificate with an airplane category rating, a multi-engine land class rating, and a Boeing 747 type rating.

Private, airline, and military pilots and pilots-in-training spend many training hours in training programs in order to become certified in a particular category, class, and/or type rating. These training programs tend to be very expensive, particularly for basic airline training, airline training to obtain certain type ratings, and military aircraft training. For private pilots, these costs are typically borne by the pilot himself, whereas aircraft and military training program costs typically are borne by the airlines or the government, respectively.

Although traditional pilot training programs are successful at producing experienced and competent pilots, these programs may be improved. More particularly, it is desirable to provide pilot training systems and methods that may reduce the number of training hours required to produce certifiable pilots, thus reducing the overall cost of a training program. Other desirable features and characteristics of the embodiments will become apparent from the subsequent detailed description of the inventive subject matter and the appended claims, taken in conjunction with the accompanying drawings and this background of the inventive subject matter.

BRIEF SUMMARY

An embodiment includes a system for assisting an operator of an apparatus that includes a control compartment. The system includes a near-eye display and a processing subsystem. The near-eye display includes a transparent display panel and is adapted to be worn on a head of the operator. The processing subsystem is communicatively coupled to the near-eye display, and is adapted to receive layout information defining a physical layout of one or more operational components located within the control compartment. The processing subsystem is further adapted to determine a location for a display indicator on the transparent display panel, where the location is determined to appear to the operator to be in proximity to an operational component of the one or more operational components, and the processing subsystem is further adapted to generate a display signal to cause the near-eye display to display the display indicator in the location.

Another embodiment includes a system for assisting a pilot of an aircraft that includes a cockpit. The system includes a near-eye display and a processing subsystem. The near-eye display includes a transparent display panel, and is adapted to be worn on a head of the pilot. The processing subsystem is communicatively coupled to the near-eye display, and is adapted to receive layout information defining a physical layout of one or more operational components located within the cockpit. The processing subsystem is further adapted to determine a location for a display indicator on the transparent display panel, where the location is determined to appear to the pilot to be in proximity to an operational component of the one or more operational components, and the processing subsystem is further adapted to generate a display signal to cause the near-eye display to display the display indicator in the location.

Another embodiment includes a method for assisting an operator of an apparatus that includes a control compartment. The method includes the steps of receiving layout information defining a physical layout of one or more operational components located within the control compartment, determining a location for a display indicator on a transparent display panel of a near-eye display, where the location is determined to appear to the operator to be in proximity to an operational component of the one or more operational components, and causing the near-eye display to display the display indicator in the location.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely representative in nature and is not intended to limit the inventive subject matter or the application and uses of the inventive subject matter. Furthermore, there is no intention to be bound by any theory presented in the preceding background or the following detailed description.

Embodiments include methods and systems adapted to assist an operator of an apparatus in its operation. Particular example embodiments described in detail below include methods and systems that are at least partially incorporated into an airplane, and that are at least partially executed in an airplane control compartment (e.g., an airplane cockpit). These example embodiments are not intended to limit the scope of the inventive subject matter to methods and systems that are incorporated into airplanes and/or executed in airplane cockpits. Instead, various alternate embodiments may be incorporated into systems that include apparatus and/or vehicles other than airplanes, and accordingly may be executed in other types of control compartments. For example, but not by way of limitation, embodiments may be at least partially incorporated into a simulator environment (e.g., a flight simulator), a helicopter, a gyroplane, a glider, an electric, hybrid or motor vehicle (e.g., a car, a truck or a bus), and a water vessel (e.g., a boat or ship). Such alternate embodiments may be at least partially executed in corresponding control compartments, such as a simulator control compartment, a helicopter cockpit, a gyroplane cockpit, a glider cockpit, a vehicle cab, or a water vessel control deck, for example.

As will be explained in detail below, embodiments may be used in the context of implementing a pilot training program, in which one or more lesson plans may be developed for the pilot (e.g., the "operator" of an aircraft), and the pilot may conduct one or more flights in conjunction with the lesson plans. Alternate embodiments may be used to train operators other than pilots (e.g., captains, navigators or drivers) or may be used in some context other than a training context (e.g., to assist an operator during his or her operation of the apparatus or vehicle in which an embodiment is at least partially incorporated). More generally, embodiments may be used in the context of assisting an operator in the operation of an apparatus or vehicle. It is to be understood that the below-described embodiments are provided as examples, and that embodiments may be implemented in a wide variety of other types of apparatus, vehicles, and contexts.

Figure 1:
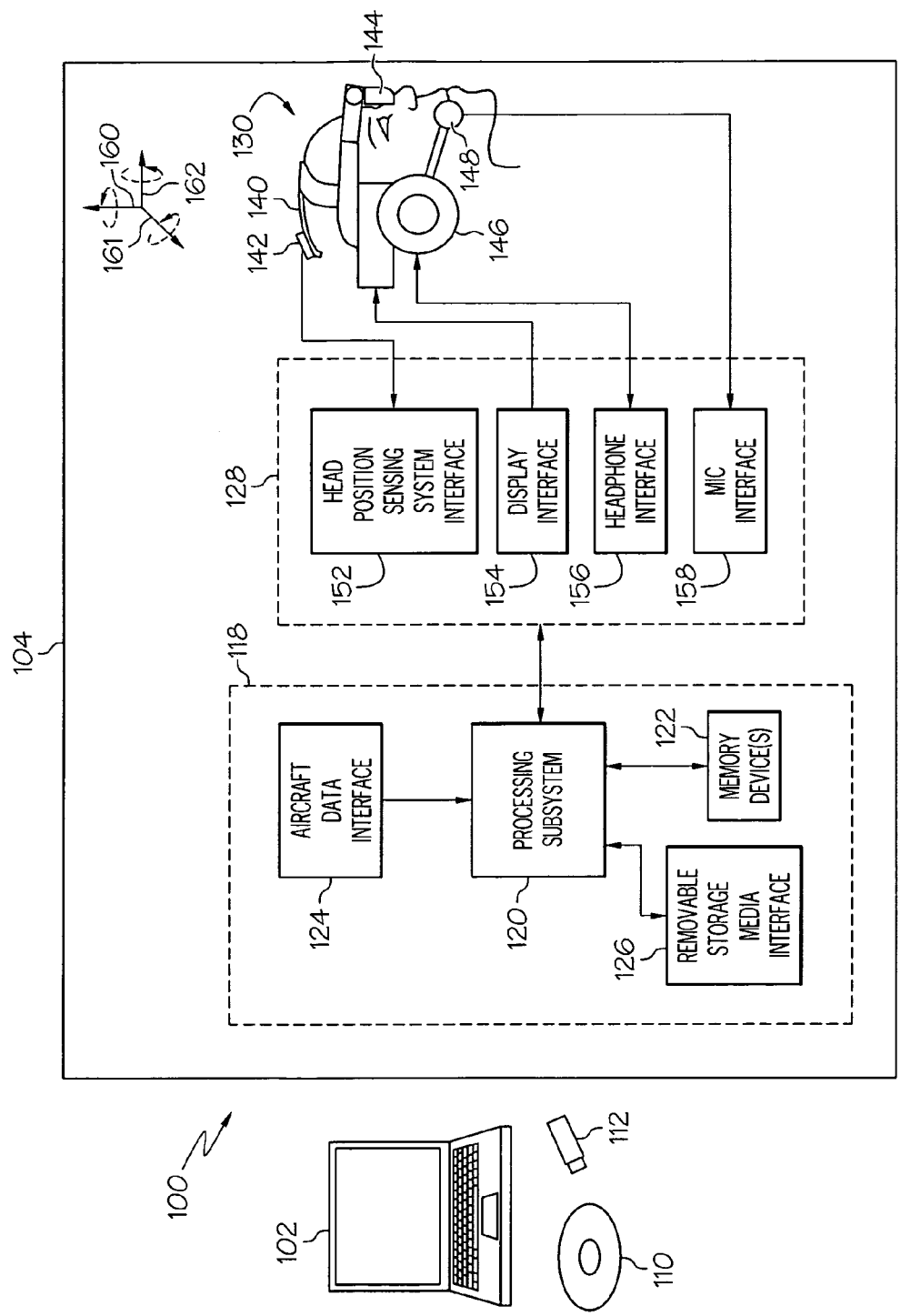
FIG. 1 is a simplified block diagram of a pilot training system, according to an example embodiment.

FIG. 1 is a simplified block diagram of a pilot training system 100, according to an example embodiment. Pilot training system 100 represents a particular type of operator assistance system. Pilot training system 100 includes one or more computers 102 and an on-board lesson plan execution system 104, in an embodiment. Briefly, a computer 102 of pilot training system 100 is adapted to enable a user (e.g., a flight instructor) to develop a computer-readable representation of a lesson plan, which may be loaded onto the on-board lesson plan execution system 104. The on-board lesson plan execution system 104 is adapted to access the lesson plan during a flight, and to store flight log data that may represent aircraft data (e.g., aircraft altitude, attitude, position, airspeed, engine revolutions per minute (RPM), among other things) and pilot data (e.g., head position, head orientation, and utterances, among other things) that are collected during the flight. Pilot training system 100 is further adapted to enable a user (e.g., the flight instructor) to render, on a computer 102, a depiction of the flight based on the stored flight log data. Computer 102 and on-board lesson plan execution system 104 are described in more detail below.

Computer 102 is adapted to execute a lesson plan development application and a flight log evaluation application, in an embodiment. As will be explained in more detail later, the lesson plan development application, when executed, enables a user (e.g., a flight instructor) to develop a computer-readable representation of a lesson plan, which may thereafter be loaded into the on-board lesson plan execution system 104 for access during a corresponding flight. The flight log evaluation application, when executed, enables a user (e.g., the flight instructor) to cause the computer 102 to render all or portions of the corresponding flight based on flight log data stored during the flight. The lesson plan development application and the flight log evaluation application may be a single application or may be separate applications, in various embodiments. In addition, although a single computer 102 is illustrated, more than one computer may be used to execute the lesson plan development application and/or the flight log evaluation application. In other words, one or more users may develop a lesson plan using one or more computers on which the lesson plan development application is loaded, and/or one or more users may evaluate a flight log using the same computer(s) or using one or more other computers on which the flight log evaluation application is loaded.

Computer 102 may include a laptop computer, a desktop computer, and/or any other computing device having a configuration sufficient to support execution of a lesson plan development application and/or a flight log evaluation application. In an embodiment, computer 102 includes one or more removable storage media interfaces (e.g., a compact disk (CD) drive and/or universal serial bus (USB) port) that enable computer 102 to copy a lesson plan onto a removable storage media (e.g., CD ROM 110 or an USB port-compatible removable storage device 112), and/or to access flight log data stored on a removable storage media. In addition or alternatively, computer 102 may include one or more interfaces (e.g., a wireless network adaptor and/or USB port) that enable computer 102 to transmit a lesson plan directly to on-board lesson plan execution system 104, and/or to directly access flight log data stored on on-board lesson plan execution system 104.

On-board lesson plan execution system 104 includes an on-board processing system 118, headgear interfaces 128, and headgear 130. The various components of on-board lesson plan execution system 104 may be communicatively coupled as illustrated, in an embodiment, in order to exchange information between the various components. On-board processing system 118 includes, in an embodiment, a processing subsystem 120, one or more memory devices 122 (e.g., random access memory (RAM), read only memory (ROM), and/or other types of memory devices), aircraft data interface 124, and removable storage media interface 126. Processing subsystem 120 includes at least one general purpose or special purpose microprocessor, in an embodiment. Processing subsystem 120 is adapted to execute a lesson plan execution application that may be stored in and accessed from a memory device 122. The lesson plan execution application, when executed, may execute computer instructions that are governed by a computer-readable lesson plan that is also accessible to processing subsystem 120. The computer-readable lesson plan may be stored in a memory device 122, in an embodiment, or may be accessed from a removable storage media (e.g., CD ROM 110 or USB port-compatible removable storage device 112) that is inserted into removable storage media interface 126 (e.g., a CD drive and/or USB port). In an embodiment, when a removable storage media (e.g., CD ROM 110 or an USB port-compatible removable storage device 112) on which a lesson plan is stored is inserted into removable storage media interface 126, processing subsystem 120 may cause the lesson plan to be downloaded into a memory device 122 for later access during a corresponding flight. Alternatively, as alluded to above, processing subsystem 120 may not download the lesson plan, but instead may access the lesson plan directly from the removable storage media during the corresponding flight.

During the process of executing a flight plan by processing subsystem 120, the lesson plan execution application also may log flight data by storing the flight data, along with marker information, into a flight data log within a memory device 122 or a removable storage media that is inserted into removable storage media interface 126. When the lesson plan execution application logs the flight data in a memory device 122, the flight data may later be downloaded onto a removable storage media that is inserted into removable storage media interface 126. Flight data may include, for example but not by way of limitation, aircraft data received through aircraft data interface 130, head position data received through head position sensor interface 152, and/or audio data received through microphone (MIC) interface 158, each of which is described in more detail below.

Also during the process of executing a flight plan by processing subsystem 120, the lesson plan execution application may cause processing subsystem 120 to generate signals adapted to cause a near-eye display 144 to display one or more display elements, as will be described in more detail later. These signals may be received and processed by a near-eye display interface 154 coupled between processing subsystem 120 and near-eye display 144, in an embodiment. In an embodiment, processing subsystem 120 determines the location of display indicators based on aircraft specific layout information, which may be stored in memory device 122, and the receipt of head position data that indicates the position and orientation of the pilot's head. The aircraft specific layout information defines static positions of one or more operational components (e.g., instruments, control components, and/or other features) located within the aircraft cockpit. In addition or alternatively, the lesson plan execution application may cause processing subsystem 120 to generate signals adapted to cause one or more headphones 146 to output audio instructions, as will also be described in more detail later. These signals may be received and processed by a headphone interface 156 coupled between processing subsystem 120 and headphones 146, in an embodiment.

Headgear interfaces 128 include, in an embodiment, a head position sensing system interface 152, a near-eye display interface 154, a headphone interface 156, and a MIC interface 158. One or more of headgear interfaces 128 may be located on headgear 130 or may be located with on-board processing system 118. The use of each of these interfaces will be explained in more detail below.

Headgear 130 includes, in an embodiment, one or more support members 140 that support one or more headgear-mounted, head position sensing components 142, a near-eye display 144, one or more headphones 146 or other speaker devices, and a microphone 148 (MIC). Headphones 146 are adapted to output audio signals received over the aircraft radio (not illustrated) and/or from processing subsystem 120 via headphone interface 156. Headphones 146 may include, for example, active noise reduction (ANR) or passive headphones. MIC 148 is adapted to detect pilot utterances or other cockpit noises and to convey those utterances or noises to the aircraft radio and/or to processing subsystem 120 via MIC interface 158. MIC 148 may include, for example, a noise cancelling microphone. In an embodiment, headgear 130 also may include a push-to-talk (PTT) switch which, when depressed, causes the aircraft radio to transmit pilot utterances detected by MIC 148 over the air. In other embodiments, a PTT switch may be included in a location other than on headgear 130.

A head position sensing system includes one or more headgear-mounted, head position sensing components 142 communicatively coupled with one or more cockpit-mounted, head position sensing components (not illustrated). The head position sensing system is adapted to measure the position of the pilot's head within the aircraft cockpit and the orientation of the pilot's head. The position of the pilot's head may be represented, for example, in terms of offsets from a static, default point in the cockpit, which may be represented in Cartesian or polar coordinates. The orientation of the pilot's head may be represented, for example, in terms of angles of rotation about a set of orthogonal reference axes (e.g., axes 160, 161, 162). For example, when the pilot turns his head to the left or right, the movement may be represented in terms of an angle of rotation about axis 160. When the pilot tilts his head up or down (e.g., nods), the movement may be represented in terms of an angle of rotation about axis 161. Finally, when the pilot tilts the top of his head from left to right, the movement may be represented in terms of an angle of rotation about axis 162.

In an embodiment, headgear-mounted, head position sensing components 142 include one or more spatially-separated elements (e.g., coils) mounted on a support member 140 of the headgear 130, and the cockpit-mounted, head position sensing components (not illustrated) include one or more other spatially-separated elements (e.g., coils) distributed within the cockpit. Information describing signals or forces communicated or detected between the headgear-mounted, head position sensing components 142 and the cockpit-mounted, head position sensing components may be communicated to processing subsystem 120 via head position sensing system interface 152. Processing subsystem 120 may analyze the signal information to determine the location and orientation of the pilot's head. In other embodiments, other types of head position sensing systems may be used and/or the signal analysis may be performed by another system element.

Near-eye display 144 may include a monocular or binocular set of transparent displays which are supported by one or more support members 140. During operation, the displays may be supported in substantially vertical positions (assuming the pilot is sitting upright) in a range of 2 to 5 centimeters from the surface of one or both eyes of a pilot that is wearing headgear 130. In an embodiment, the displays may be coupled to a hinging element that enables the displays to be tilted upward and substantially out of the pilot's field of view when not in use. In an embodiment, each transparent display may include a transparent display panel, a light source (e.g., light emitting diodes), one or more prisms adapted to deflect light generated by the light source, one or more polarizers, and one or more lenses. The transparent display panel may include, for example, a liquid crystal display (e.g., a liquid crystal on silicon display) or some other type of transparent display.

Near-eye display 144 may be coupled to one or more display engines (not illustrated). In an embodiment, a display engine is located on headgear 130, and receives display signals from processing subsystem 120 via near-eye display interface 154. In another embodiment, the display engine may form a portion of processing subsystem 120 or may be located within on-board processing system 118 or elsewhere. Either way, in an embodiment, during the process of executing a flight plan by processing subsystem 120, processing subsystem 120 may determine that one or more cockpit instruments, control components or other visual elements are desired to be indicated based on the portion of the flight plan being executed and received aircraft data. In addition, processing subsystem 120 may determine positions for the indicators (e.g., display indicators 302, 304, 306, FIG. 3) on the transparent display panel based on the layout of the instruments and control components within the cockpit (e.g., the "cockpit layout") and the position and orientation of the pilot's head with respect to the cockpit layout. Processing subsystem 120 may generate and send display signals to the near-eye display via the display engine, where the display signals indicate the configuration and position of the indicators on the transparent display panel. The display engine is adapted to analyze the display signals and to cause pixels of the transparent display panel to be activated or deactivated in order to produce visible renderings of the desired display indicators on the transparent display panel. As a result, the near-eye display may display one or more display indicators overlying (or otherwise in proximity to) one or more cockpit instruments, control components or other visual elements.

Figure 2:
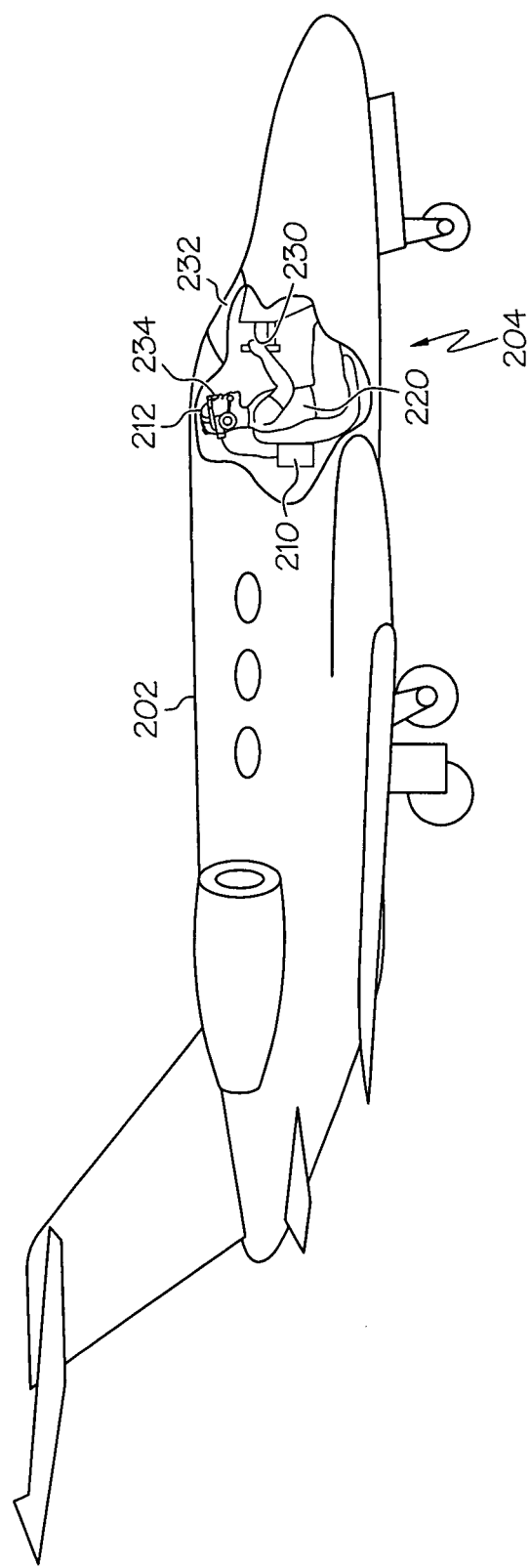
FIG. 2 is a cut-away, side view of an airplane in which an on-board lesson plan execution system is incorporated, according to an example embodiment.

FIG. 2 is a cut-away, side view of an airplane 202 in which an on-board lesson plan execution system 204 is incorporated, according to an example embodiment. On-board lesson plan execution system 204 includes an on-board processing system 210 (e.g., on-board processing system 118, FIG. 1), headgear interfaces (not illustrated, e.g., headgear interfaces 128, FIG. 1), and headgear 212 (e.g., headgear 130, FIG. 1). On-board processing system 210 may be completely or partially located in or in proximity to the pilot's seat, as illustrated, or may be completely or partially located elsewhere in the airplane 202 (e.g., behind or in proximity to the airplane's instrument panel 230 or elsewhere). In an embodiment, headgear 212 may be operatively coupled to headgear interfaces and/or on-board processing system 210 through cabling and/or through wireless connections.

Headgear 212 may be worn by a pilot 220 while preparing for and conducting a flight. While seated with headgear 212 properly in place, the pilot 220 may generally face the airplane instrument panel 230 and the windshield 232. As indicated above, and as will be explained in more detail below, when the on-board processing system 210 determines that a display indicator should be displayed on the near-eye display 234, the on-board processing system 210 issues a display command, and the display driver causes the display indicator to be displayed according to the display command. Because the near-eye display 234 includes a transparent display panel, the display indicator may appear to overlie the instrument panel 230 and windshield 232. In an embodiment, the display indicators are positioned in a manner that is conformal to the layout of the instrument panel 230, the positions of the aircraft control components, and/or the windshield 232, regardless of the pilot's head position and orientation. In other words, the on-board processing system 210 determines the display position for each display indicator based on its knowledge of the cockpit layout combined with its knowledge of the pilot's head position and orientation. In an embodiment, the on-board processing system 210 may acquire knowledge of the cockpit layout by accessing stored aircraft specific layout information, which defines the physical layout (e.g., the absolute or relative positions and/or boundaries) of the operational components of the aircraft (e.g., the aircraft instruments and control components). In an embodiment, the aircraft specific layout information also may specify the positions and/or boundaries of the windshield and/or windows.

Figure 3:
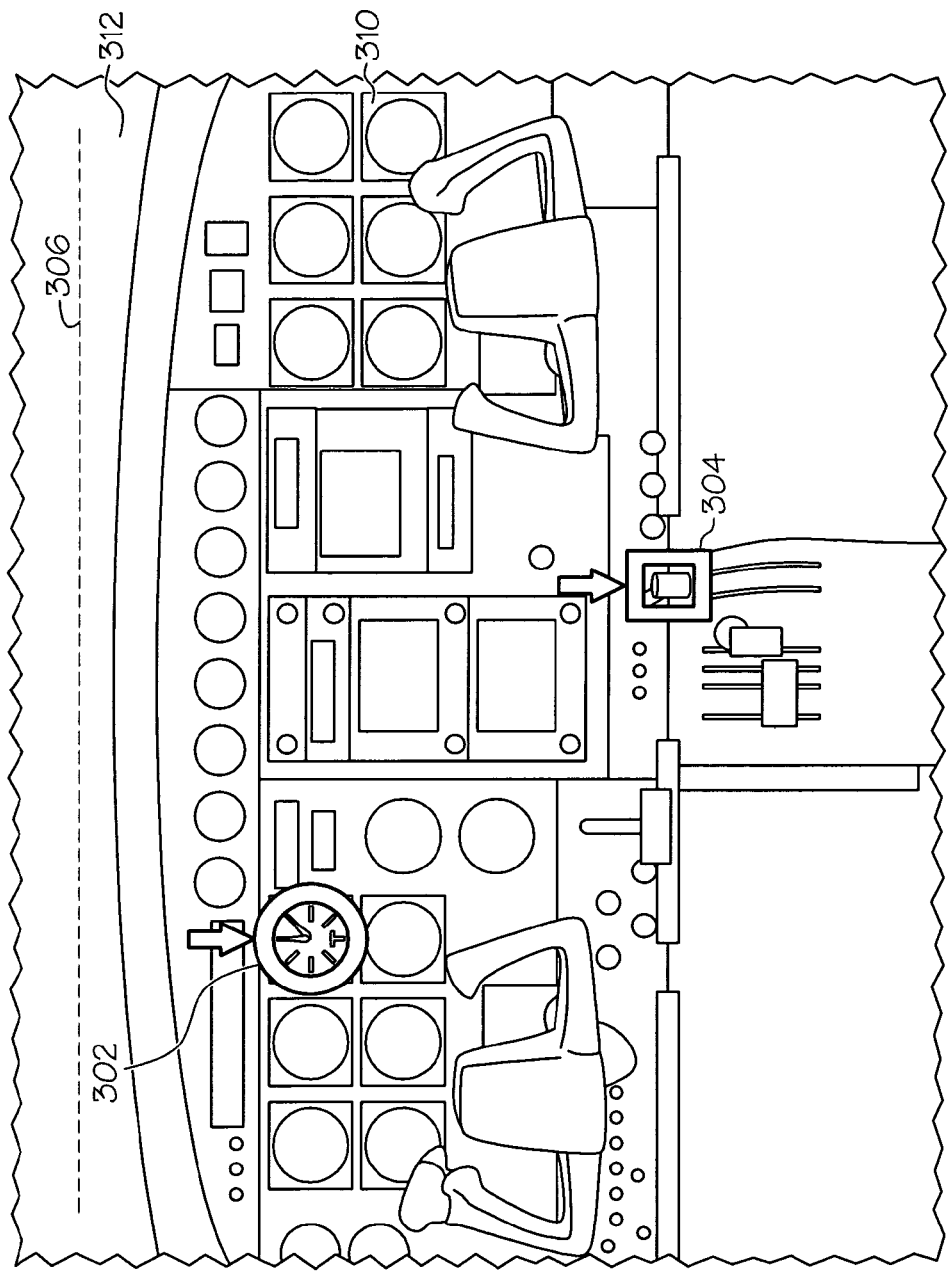
FIG. 3 is an example of various display indicators displayed on a transparent display panel overlying an airplane instrument panel and windshield, according to an example embodiment.

FIG. 3 is an example of various display indicators 302, 304, 306 displayed on a transparent display panel overlying an airplane instrument panel 310 and windshield 312, according to an example embodiment. The view illustrated in FIG. 3 is a pilot's-eye view, where the pilot is located within the control compartment (i.e., the cockpit) of an airplane. As used herein, the term "control compartment" means a platform or compartment of an apparatus or vehicle within which an embodiment is at least partially operated, and which includes one or more instruments or control components that may be viewed by and/or manipulated by an operator (e.g., a pilot) of the apparatus or vehicle. Further describing the perspective of FIG. 3, one may assume that the pilot is wearing headgear (e.g., headgear 130, FIG. 1) and is viewing the airplane instrument panel 310 and windshield 312 through the transparent display of a near-eye display (e.g., near-eye display 144, FIG. 1). In an embodiment, various display indicators 302, 304, 306 may be displayed on the display panel of the near-eye display and observed by the pilot.

Display indicators 302, 304, 306 may include, for example but not by way of limitation, instrument indicators (e.g., the altimeter, the attitude indicator, the fuel gage, etc.), aircraft control component indicators (e.g., the yoke, the ignition, the throttle, the flap lever, the brake, the rudder pedals, etc.), and/or exterior feature indicators (e.g., features exterior to the cockpit such as the horizon, a runway, another aircraft, a ground obstacle, etc.). In an embodiment, "interior" display indicators include indicators of features inside the cockpit, such as instrument indicators and control component indicators. In an embodiment, interior display indicators may be positioned on the display panel to overlie or indicate areas of a cockpit that include the instrument panel 310 and control components. In contrast, "exterior" display indicators include indicators of features outside the cockpit, and these exterior display indicators may be positioned on the display panel to overlie areas that correspond to the windshield 312 or other windows. For example, exterior feature indicator 306 corresponds to a horizon indicator, and includes a dashed linear component that may conform to the position of the horizon from the pilot's perspective.

Display indicators 302, 304, 306 are configured, in an embodiment, with the intention to direct a pilot's attention to the indicated instrument, control component, or exterior feature without significantly obscuring the instruments, control components or exterior view. For example, instrument indicator 302 includes a donut shaped feature that encircles the instrument (e.g., the altimeter) that is intended to be indicated, while still allowing the instrument itself clearly to be viewed. Similarly, control component indicator 304 includes a rectangular shaped feature that encompasses the control component (e.g., the flap lever) that is intended to be indicated, while still allowing the control component clearly to be viewed. Desirably, the shape of each instrument indicator and control component indicator conforms to the perimeter shape of the instrument or control component being indicated. Accordingly, when an instrument or control component has a circular perimeter, the shape of its corresponding instrument indicator or control component indicator also may be circular. Alternatively, when an instrument or control component has a rectangular perimeter or has some other shape, the shape of its corresponding instrument indicator may have the same shape. In addition to a shaped component overlying the instrument, each of instrument indicator 302 and control component indicator 304 may include an arrow feature, as illustrated, that may be effective in directing the pilot's attention to the indicated instrument or control component. Although display indicators 302 and 304 appear to overlie the instruments that they are intended to draw attention to, display indicators may not appear to overlie the instruments, in other embodiments. Instead, a display indicator may be placed in proximity to an instrument in order to draw attention to the instrument. As used herein, the term "in proximity to" includes "overlying," "adjacent to," "above," "below," "surrounding," and "partially surrounding."

The graphical depiction of the display indicators (e.g., display indicators 302, 304, 306) may be accessed from a library of display indicator configurations that may be stored in on-board memory (e.g., memory device 122, FIG. 1). Although display indicators 302, 304, 306 having certain configurations are illustrated in FIG. 3, these configurations are only examples, and other types of display indicators may be designed for a particular system. Such other types of display indicators may include flashing or fading elements, colored elements, and/or text elements, for example. In addition, other types of display indicators may be implemented, for example, to indicate a direction of an exterior feature (e.g., the direction of an airport, another aircraft or true North, to name a few examples), a target point on an instrument or control component (e.g., a target altitude displayed overlying the altimeter, a target attitude overlying the attitude indicator, and/or a target direction to rotate the yoke, to name a few examples). Accordingly, although several display elements 302, 304, 306 are illustrated in FIG. 3, the illustrated display elements 302, 304, 306 are not intended to limit the inclusion of a wide variety of other display element configurations, in other embodiments.

Figure 4:
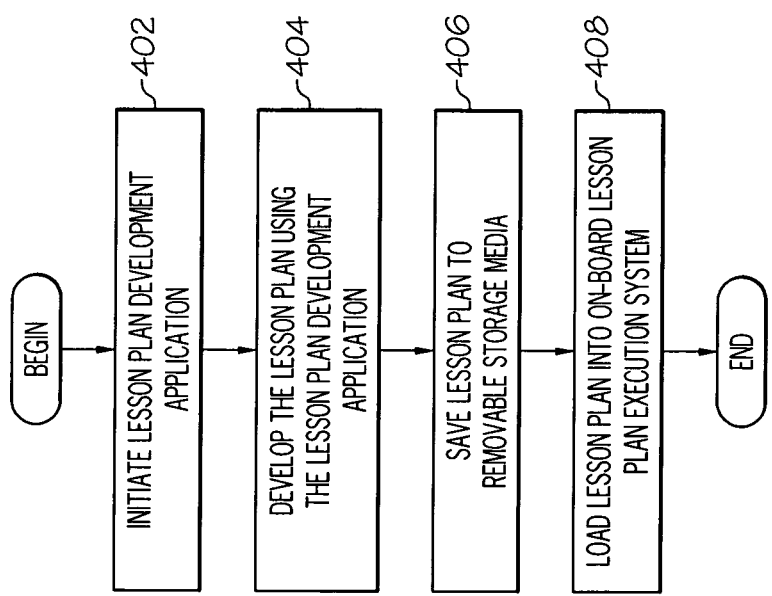
FIG. 4 is a flowchart of a method for developing a lesson plan using a lesson plan development application, according to an example embodiment.
Figure 6:
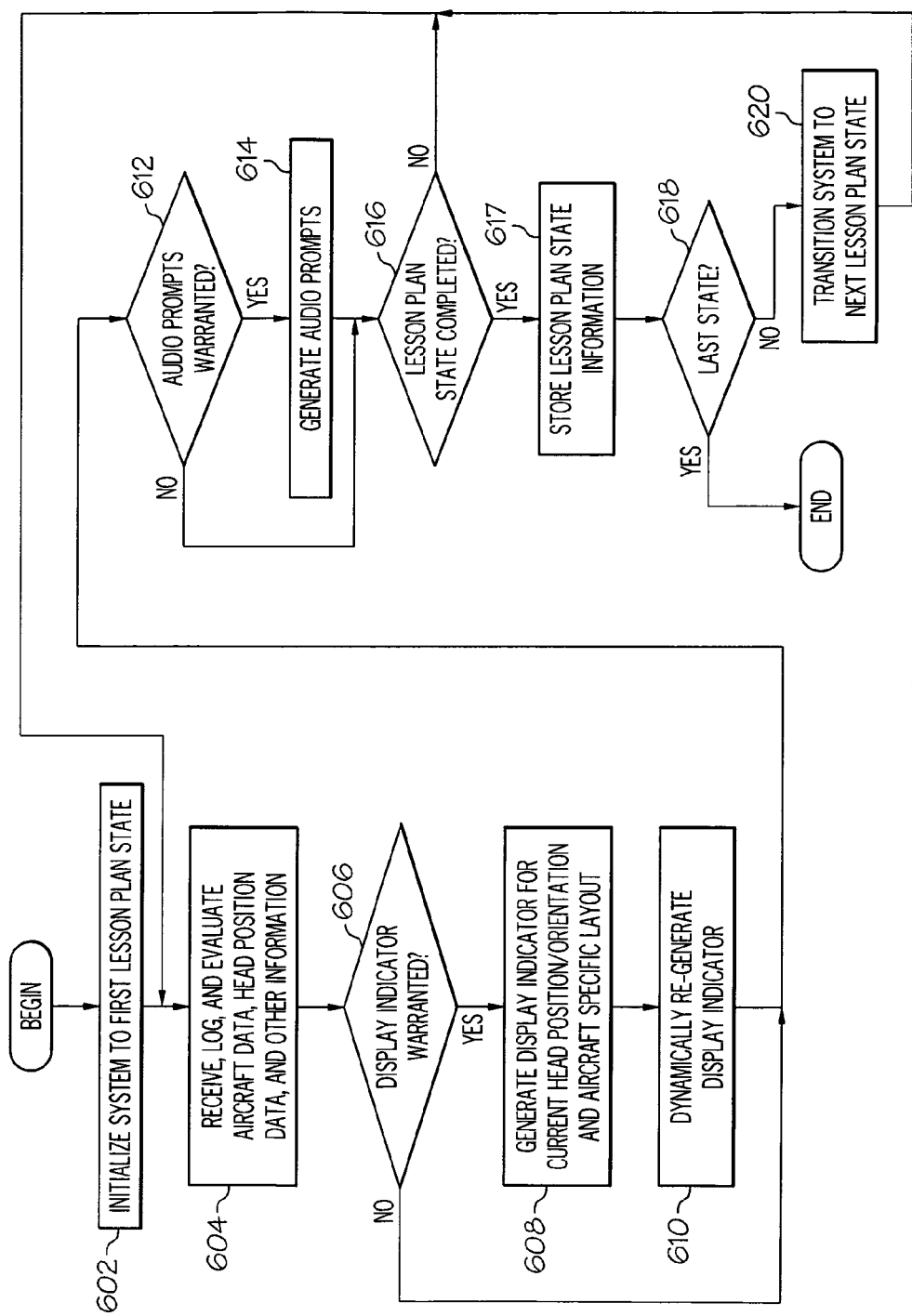
FIG. 6 is a flowchart of a method for assisting a pilot in the operation of an airplane, or more particularly for initiating and conducting a pilot training session, according to an example embodiment.
Figure 7:
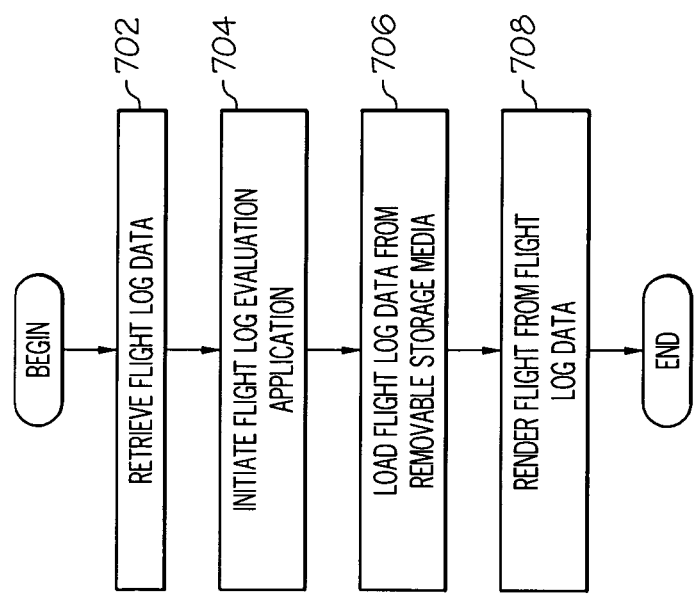
FIG. 7 is a flowchart of a method for retrieving and evaluating flight log data, according to an example embodiment.

As discussed previously, a pilot training system (e.g., pilot training system 100, FIG. 1) according to an embodiment may include a computer (e.g., computer 102, FIG. 1) adapted to enable a user (e.g., a flight instructor) to develop a computer-readable representation of a lesson plan, which may be loaded onto an on-board lesson plan execution system (e.g., on-board lesson plan execution system 104, FIG. 1). The on-board lesson plan execution system is adapted to access the lesson plan during a flight, and to store flight log data that may represent aircraft data (e.g., aircraft altitude, attitude, position, airspeed, engine power, among other things) and pilot data (e.g., head position and orientation and speech, among other things) that are collected during the flight. In an embodiment, a pilot training system may be further adapted to enable a user (e.g., the flight instructor) to render, on a computer, a depiction of the flight based on the stored flight log data. FIGS. 4, 6, and 7, below, illustrate flowcharts of methods for developing a lesson plan, initiating and conducting a pilot training session (e.g., a flight), and retrieving and evaluating flight log data, respectively, according to various embodiments.

FIG. 4 is a flowchart of a method for developing a lesson plan using a lesson plan development application, according to an example embodiment. As mentioned previously, a lesson plan development application may be executed on a computer (e.g., computer 102, FIG. 1) of a pilot training system. The method may begin, in an embodiment, when the lesson plan development application is initiated, in block 402. This may occur, in an embodiment, when a user (e.g., a flight instructor) selects the lesson plan development application via a user interface of the computer, and initiates execution of an instance of the lesson plan development application.

In an embodiment, the lesson plan development application, when initiated, may cause the computer to display a lesson plan development window, which may include one or more menu options. Menu options may include initiating generation of a new lesson plan, opening an existing lesson plan, and/or selecting a lesson plan template from a library of available templates. In an embodiment, each lesson plan is represented in computer-readable form as a collection of one or more lesson plan states. Each lesson plan state may correspond to a portion of a planned flight, as will be described in more detail in conjunction with FIG. 5, below. In an alternate embodiment, a lesson plan may be represented simply as a sequence of instructions that linearly progress through a planned flight.

Either way, in block 404, the user may develop a computer-readable representation of a lesson plan using the lesson plan development application. In an embodiment in which a lesson plan is represented as a collection of one or more lesson plan states, the user may establish the one or more lesson plan states, and may develop particular details corresponding to each state. A detailed example of a lesson plan state diagram will be described in conjunction with FIG. 5, below.

Once the computer-readable representation of the lesson plan has been developed, the user may save the lesson plan to a removable storage media (e.g., CD ROM 110 or USB port-compatible removable storage device 112, FIG. 1), in block 406. The user may then insert the removable storage media into a removable storage media storage interface (e.g., removable storage media storage interface 126, FIG. 1), in order to load the lesson plan into the on-board lesson plan execution system, in block 408. In an embodiment, when the removable storage media is inserted into the removable storage media storage interface, an on-board processing subsystem (e.g., on-board processing subsystem 120, FIG. 1) may automatically copy the lesson plan stored on the removable storage media into an on-board memory device (e.g., memory device 122, FIG. 1). The lesson plan may then be accessed during a subsequent flight. In an alternate embodiment, a lesson plan may be accessed directly from the removable storage media, rather than downloading the lesson plan to an on-board memory device. In still another alternate embodiment, the on-board lesson plan execution system may include a user interface (e.g., a display and keyboard) that enable the user to control the download of the lesson plan, rather than automatically downloading the lesson plan when the removable storage media is inserted. In still another alternate embodiment, a lesson plan may be downloaded via a wireless connection between the on-board lesson plan execution system and a remote storage media within which the lesson plan is stored. Either way, once the lesson plan is accessible to the on-board lesson plan execution system, the method may end.

Figure 5:
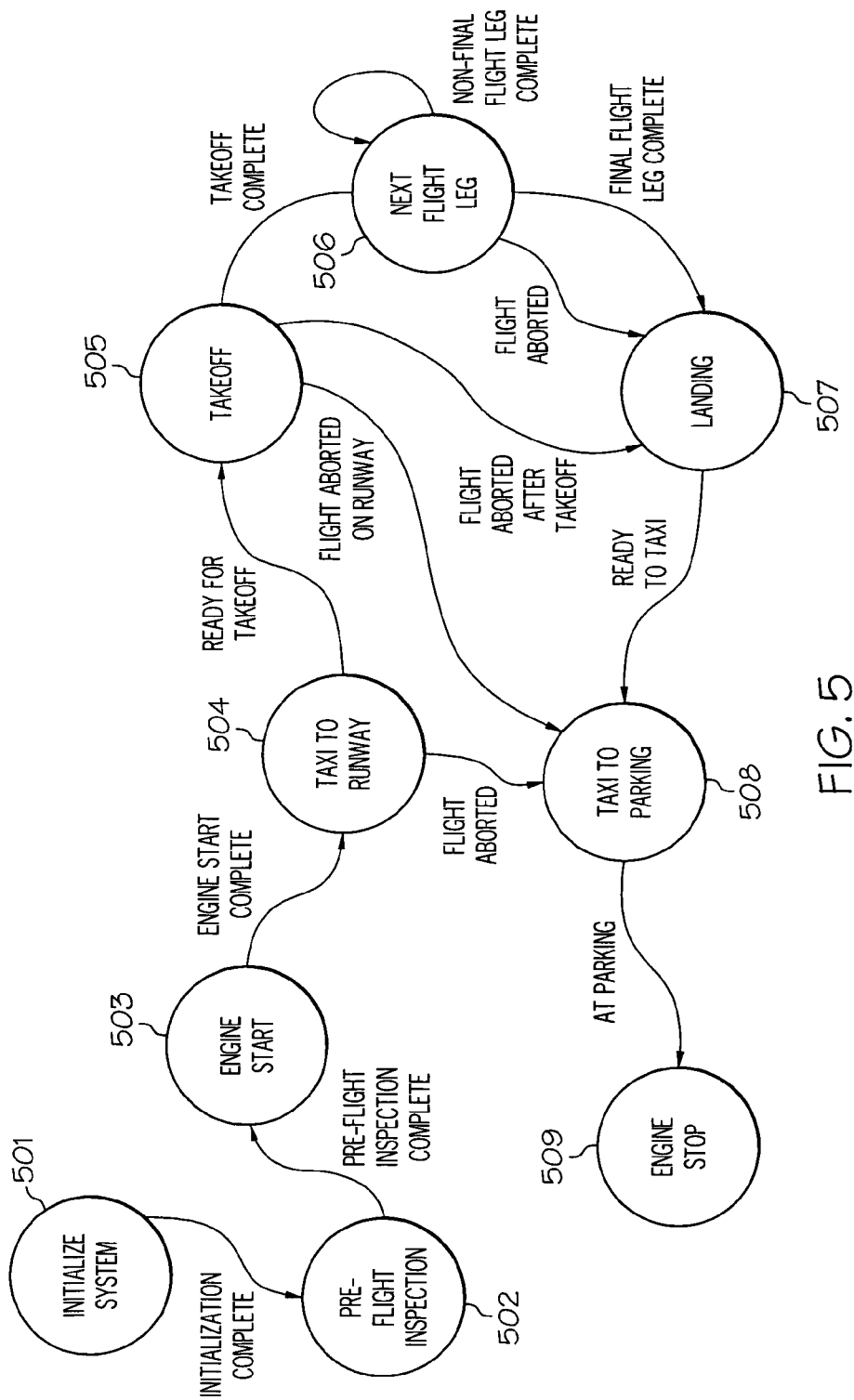
FIG. 5 is an example of a lesson plan state diagram, according to an example embodiment.

FIG. 5 is an example of a lesson plan state diagram, according to an example embodiment. The lesson plan state diagram represents a lesson plan as a plurality of lesson plan states 501, 502, 503, 504, 505, 506, 507, 508, 509, where each lesson plan state 501-509 corresponds to a portion of a planned flight. It is to be understood that the lesson plan state diagram illustrated in FIG. 5 is for example purposes only, and corresponds to a certain type of planned flight. Lesson plans that include more, fewer, and/or different lesson plan states may be developed using a lesson plan development application, in other embodiments.

Each lesson plan state 501-509 may include software instructions, data, and/or other computer-readable indicia of a sequence of steps or a group of actions that should occur when the lesson plan is executed and the lesson plan is in the particular state. In addition, in an embodiment, one or more of lesson plan states 501-509, when executed, may cause the on-board lesson plan execution system (e.g., on-board lesson plan execution system 104, FIG. 1) to display one or more indicators (e.g., display indicators 302, 304, 306, FIG. 3) intended to direct the attention of the pilot to the instruments, control components, and/or exterior features that appear to be proximate to the display indicators. A display indicator may be displayed in response to a decision that the pilot should direct his or her attention to a particular instrument, control component, and/or exterior feature, in an embodiment. Alternatively, a display indicator may be displayed automatically as the sequence of steps associated with a lesson plan state 501-509 is being performed. In an embodiment, one or more of lesson plan states 501-509, when executed, also may cause the on-board lesson plan execution system to output one or more audio prompts or instructions via the headphones (e.g., headphones 146, FIG. 1). For purposes of brevity, the description of FIG. 5, below, focuses on the display of display indicators, and audio prompts or instructions are not discussed in detail.

In addition to causing display indicators to be displayed and/or audio prompts to be output, the on-board lesson plan execution system also may log certain information during execution of the flight plan. In various embodiments, information that may be logged may include aircraft data, head position data, pilot utterances and/or cabin noises (received through the microphone), radio transmissions (received through the headphones), and/or other information. The information may be logged, for example, by storing time-tagged or state-tagged data corresponding to the information in a memory device (e.g., memory device 122, FIG. 1) or in a removable storage media that may be inserted into the system. As will be described later in conjunction with FIG. 7, this information may be rendered after completion of a flight in order to facilitate an analysis of the pilot's compliance with the lesson plan, among other things. For purposes of brevity, the description of FIG. 5 below, does not discuss logging information in detail.

The representation of the lesson plan indicated in FIG. 5 may correspond, for example, to a first solo flight of a pilot. Each of the lesson plan states 501-509 will now be discussed briefly, along with a discussion of some example display indicators that the on-board lesson plan execution system may cause to be displayed within each lesson plan state 501-509. It is to be understood that the discussion of the lesson plan states 501-509 and the example display indicators is for example purposes only, and is not to be construed as limiting. Transitions between states 501-509 may occur automatically based on decisions made by the on-board lesson plan execution system (e.g., decisions based on received aircraft data, global positioning system data, and/or other information), in an embodiment. In other embodiments, a pilot may cause a lesson plan state transition through a user input received via a user interface of the on-board lesson plan execution system, a sequence of PTT switch clicks or some other means.

During a pilot training session in which the lesson plan is executed, the on-board lesson plan execution system may first enter an "initialize system" state 501. The initialize system state 501 may be entered upon boot-up (e.g., power up) of the on-board lesson plan execution system, in an embodiment. The software instructions associated with the initialize system state 501 may, for example, cause the on-board lesson plan execution system to perform actions such as calibrating the head position sensing system, calibrating the near-eye display, and determining the state of the aircraft based on aircraft data received through an aircraft data interface (e.g., aircraft data interface 124, FIG. 1), for example. Calibration processes may or may not include providing display or audio prompts to the pilot to take certain actions (e.g., hold the head straight, look at a target point, indicate accuracy of the location of a displayed indicator, or the like).

Upon completion of the initialization process associated with the initialize system state 501, execution of the lesson plan may transition to a "pre-flight inspection" state 502. The software instructions associated with the pre-flight inspection state 502 may cause the on-board lesson plan execution system to display certain display indicators that indicate the sequence of steps that the pilot should take prior to starting the engine. For example, the pilot may be prompted through a sequence of pre-flight inspection cabin checklist items. In an embodiment, the software instructions may cause the on-board lesson plan execution system automatically to display a sequence of display indicators that corresponds to the sequence of pre-flight inspection cabin checklist items (e.g., check fuel quantity, check lights, set flaps, set fuel selector valve, and so on).

In conjunction with each display indicator that is displayed, the software instructions may include determinations of whether the corresponding step has been completed before prompting the pilot to perform the next step, in an embodiment. In addition or alternatively, the software instructions may cause certain display indicators to be displayed only upon a determination that the pilot has skipped a step or that there is an out-of-range condition (e.g., the fuel level is below a threshold level). The on-board lesson plan execution system may make determinations that a step has been completed or skipped or that an out-of-range condition exists, for example, based on aircraft data received through the aircraft data interface (e.g., aircraft data interface 124, FIG. 1). For example, when the lesson plan indicates that the pilot should set the flaps in the "DOWN" position, the software instructions associated with the lesson plan may cause the on-board lesson plan execution system to determine, via received aircraft data, whether the flaps currently are in the "DOWN" position. If they are not, then the software instructions may cause the on-board lesson plan execution system to display a control component indicator (e.g., control component indicator 304, FIG. 3) overlying the flap lever. Once the on-board lesson plan execution system has determined that the flaps have been set in the "DOWN" position, the software instructions may cause the on-board lesson plan execution system to remove the control component indicator overlying the flap lever. In this manner, the software instructions associated with the pre-flight inspection state 502 may prompt the user through the state.

Upon completion of the pre-flight inspection process associated with the pre-flight inspection state 502, execution of the lesson plan may transition to an "engine start" state 503. Similar to previous states, the software instructions associated with the engine start state 503 may cause the on-board lesson plan execution system to display certain display indicators that indicate the sequence of steps that the pilot should take in the process of starting the engine. Certain display indicators may be displayed automatically as the pilot performs each step in the sequence, and/or certain display indicators may be displayed when a determination is made that the pilot has skipped a step or that an out-of-range condition exists, as discussed previously. For example, the pilot may be prompted through a sequence of before takeoff checklist items (e.g., apply brakes, check fuel selector valve, set elevator trim, turn ignition key, adjust mixture and throttle, check and set various instruments, set radio frequency, check automatic terminal information service (ATIS) transmission, release parking break, and so on).

Upon completion of the engine start process associated with the engine start state 503, execution of the lesson plan may transition to a "taxi to runway" state 504. Similar to previous states, the software instructions associated with the taxi to runway state 504 may cause the on-board lesson plan execution system to display certain display indicators that indicate the sequence of steps that the pilot should take in the process of taxiing to the runway. Certain display indicators may be displayed automatically as the pilot performs each step in the sequence, and/or certain display indicators may be displayed when a determination is made that the pilot has skipped a step or that an out-of-range condition exists, as discussed previously. In addition, as the aircraft may be taxiing in an area where other aircraft may be in close proximity, the software instructions associated with the taxi to runway state 504 may include evaluating information received from the head position sensing system to determine whether the pilot appears to be looking outside the aircraft for obstacles and other traffic. If the pilot does not appear to be looking outside of the aircraft, the software instructions may include causing the on-board lesson plan execution system to display a display prompt (e.g., a text message) indicating that the pilot should look outside the aircraft and/or to output an audio message to the same effect. In addition, the software instructions associated with the taxi to runway state 504 may include receiving aircraft data indicating the ground speed of the aircraft. When a determination is made that the ground speed exceeds an out-of-range condition (e.g., the ground speed is faster than an upper speed threshold), the software instructions may include causing the on-board lesson plan execution system to display a display prompt indicating the throttle and/or to output an audio message that prompts the pilot to slow down.

Upon completion of the taxiing process associated with the taxi to runway state 504, execution of the lesson plan may transition to a "takeoff" state 505. Similar to previous states, the software instructions associated with the takeoff state 505 may cause the on-board lesson plan execution system to display certain display indicators that indicate the sequence of steps that the pilot should take in the process of taking off. For example, the pilot may be prompted through a sequence of runway lineup and/or takeoff checklist items (e.g., set radio frequency to tower frequency, set flaps, obtain runway clearance, turn on transponder, adjust mixture, check engine gauges, adjust throttle to full, rotate elevator, set flaps to "UP", check airspeed, raise landing gear, adjust throttle to cruise, check heading, and so on). Certain display indicators may be displayed automatically as the pilot performs each step in the sequence, and/or certain display indicators may be displayed when a determination is made that the pilot has skipped a step or that an out-of-range condition exists, as discussed previously. When a determination is made, for example, that the airspeed during takeoff is below a threshold (e.g., the aircraft may be approaching a stall speed), the software instructions may include causing the on-board lesson plan execution system to display a display prompt in proximity to the airspeed indicator and/or may output an audio message to the same effect.

Upon successful completion of the takeoff process associated with the takeoff state 505, execution of the lesson plan may transition to a "next flight leg" state 506. Similar to previous states, the software instructions associated with the next flight leg state 506 may cause the on-board lesson plan execution system to display certain display indicators that indicate the sequence of steps that the pilot should take during the next flight leg. A flight leg may include, for example, flying to a practice area, performing one or more maneuvers in the practice area, and flying back toward the departure airport. For each flight leg, the pilot may be prompted through a sequence of processes and/or may be prompted to check various instruments, control components, and/or features outside the cockpit (e.g., set radio frequency, check or change altitude, check or change airspeed, check or change attitude, perform a maneuver (e.g., stall, turn, set up for emergency landing, perform touch-and-go, and so on), adjust mixture or throttle, check or change heading, look for traffic, look at the horizon, and so on). Certain display indicators may be displayed automatically as the pilot performs each step in the sequence, and/or certain display indicators may be displayed when a determination is made that the pilot has skipped a step or that an out-of-range condition exists, as discussed previously. Each time a non-final flight leg has been completed, execution of the lesson plan may transition back to the next flight leg state or to another flight leg state. For purposes of simplicity, only a single flight leg state 506 is illustrated in FIG. 5.

Upon successful completion of the final flight leg associated with the next flight leg state 506, execution of the lesson plan may transition to a "landing" state 507. In an embodiment, execution of the lesson plan also may transition to the landing state 507 from the takeoff state 505 when, for example, the flight has been aborted after takeoff when the aircraft is in the air. In addition, in an embodiment, execution of the lesson plan also may transition to the landing state 507 from the next flight leg state 506 prior to the completion of the final flight leg when, for example, the flight is being aborted prior to completion of the final flight leg. Similar to previous states, the software instructions associated with the landing state 507 may cause the on-board lesson plan execution system to display certain display indicators that indicate the sequence of steps that the pilot should take in the process of entering the landing pattern and landing. For example, the pilot may be prompted through a sequence of landing checklist items (e.g., set radio frequency to tower, check and adjust throttle and mixture, check ATIS transmission, lower landing gear, check and adjust altitude, set fuel selector valve, turn landing light on or off, set flaps, check and adjust airspeed, set radio frequency to ground control, and so on). Certain display indicators may be displayed automatically as the pilot performs each step in the sequence, and/or certain display indicators may be displayed when a determination is made that the pilot has skipped a step or that an out-of-range condition exists, as discussed previously. When a determination is made, for example, that the landing gear is not down at the appropriate time, the software instructions may include causing the on-board lesson plan execution system to display a display prompt in proximity to the landing gear switch and/or may output an audio message to the same effect.

Upon successful completion of the landing process associated with the landing state 507, execution of the lesson plan may transition to a "taxi to parking" state 508. In an embodiment, execution of the lesson plan also may transition to the taxi to parking state 508 from the takeoff state 505 when, for example, the flight has been aborted during takeoff when the aircraft is still on the runway. Alternatively, execution of the lesson plan may transition to the taxi to parking state 508 from the taxi to runway state 504 when, for example, the flight has been aborted during the taxi to the runway. Similar to previous states, the software instructions associated with the taxi to parking state 508 may cause the on-board lesson plan execution system to display certain display indicators that indicate the sequence of steps that the pilot should take in the process of taxiing to parking. Certain display indicators may be displayed automatically as the pilot performs each step in the sequence, and/or certain display indicators may be displayed when a determination is made that the pilot has skipped a step or that an out-of-range condition exists, as discussed previously. In addition, the software instructions associated with the taxi to parking state 508 may include evaluating information received from the head position sensing system and/or received aircraft data indicating the ground speed of the aircraft, as discussed previously.

Upon successful completion of the taxiing process associated with the taxi to parking state 508, execution of the lesson plan may transition to an "engine stop" state 509. Similar to previous states, the software instructions associated with the engine stop state 509 may cause the on-board lesson plan execution system to display certain display indicators that indicate the sequence of steps that the pilot should take in the process of parking and shutting off the engine. For example, the pilot may be prompted through a sequence of parking checklist items (e.g., turn off electrical, lights, avionics, master switch, and ignition switch, cut off mixture, and so on). Certain display indicators may be displayed automatically as the pilot performs each step in the sequence, and/or certain display indicators may be displayed when a determination is made that the pilot has skipped a step or that an out-of-range condition exists, as discussed previously. In the state diagram illustrated in FIG. 5, completion of the engine stop state 509 corresponds to completion of the lesson plan and the pilot training session.

The state diagram of FIG. 5 includes a specific example of a lesson plan that may be executed by an on-board lesson plan execution system (e.g., on-board lesson plan execution system 104, FIG. 1) in order to conduct a pilot training session. As indicated above, certain sequences of software instructions associated with the computer-readable lesson plan and/or the lesson plan execution application may cause the on-board lesson plan execution system either to: 1) determine that a display indicator is warranted and to display the display indicator on the near-eye display (e.g., near-eye display 144, FIG. 1) in a manner that conforms to the cockpit layout and takes into account the position of the pilot's head; 2) determine that an audio prompt is warranted and to output the audio prompt through the headphones (e.g., headphones 146, FIG. 1); and/or 3) log information received during the pilot training session, including aircraft data, head position data, and/or audio information received through the microphone and/or radio. FIG. 6 is provided in order to more clearly describe the above processes when performed in conjunction with a lesson plan state. It is to be understood that some or all of the above processes may be performed multiple times within a particular state or some or all of the above process may not be performed at all within a particular state. In addition, it is to be understood that some or all of the above processes may be performed in the context of a software architecture that does not include state transitions.

FIG. 6 is a flowchart of a method for assisting a pilot in the operation of an airplane, or more particularly for initiating and conducting a pilot training session, according to an example embodiment. The method may begin, in block 602, by initializing an on-board lesson plan execution system to a first lesson plan state (e.g., initialize system state 501, FIG. 5). Initialization of the on-board lesson plan execution system may be triggered, for example, by the application of power to the on-board lesson plan execution system and/or when some other initialization triggering event occurs (e.g., the pilot provides a user interface input that indicates that the on-board lesson plan execution system should be initialized). Initialization may include, for example, initiating an instance of a lesson plan execution application on a processing subsystem (e.g., processing subsystem 120, FIG. 1) of the on-board lesson plan execution system. The lesson plan execution application may automatically access a previously-downloaded lesson plan from a memory device (e.g., memory device 122) or from a removable storage media inserted into a removable storage media interface (e.g., removable storage media interface 126, FIG. 1). In order to initialize the system to the first lesson plan state, the processing subsystem may load and begin executing software instructions corresponding to the first lesson plan state.

Blocks 602-614 generically indicate some of the processes that may be performed during execution of a lesson plan, according to various embodiments. In block 604, the processing subsystem may receive, log, and evaluate aircraft data, head position data, and/or audio information. For example, the processing subsystem may receive aircraft data through one or more aircraft data interfaces (e.g., aircraft data interface 124, FIG. 1). Aircraft data may include information (e.g., digital and/or analog signals) that indicate the states (e.g., the operational status and/or setting) of various aircraft components such as the aircraft engine or motor, other aircraft subsystems, flight control surfaces, instruments, and/or control components, among other things. Aircraft data may include, for example but not by way of limitation, digital and/or analog data or signals from instruments, control components, aircraft subsystems or other sources that indicate altitude, attitude, position, airspeed, engine RPM, fuel level, flight control surface settings, and/or control component settings, among other things. In embodiments that are implemented in apparatus or vehicles other than airplanes, information other than aircraft data that is relevant to the operational status of the apparatus or vehicle and its various subsystems, instruments, and control components may be received, logged, and evaluated.

The processing system may receive head position data through an interface with a head position sensing system (e.g., head position sensing system interface 152). As discussed previously, the head position data may indicate the pilot's head orientation and head position within the cockpit. Audio information may be received from the aircraft radio and/or through an interface with a microphone (e.g., microphone 148 and MIC interface 158, FIG. 1).

The processing subsystem may determine which information should be logged, and may selectively log the received information. The determination of which information should be logged may be specified by software instructions currently being executed and/or by the state of one or more registers that may include indications of which information to log at any given time. Logging information may include storing a representation of the information (referred to as "flight log data") within a memory device (e.g., memory device 122, FIG. 1). In an embodiment, information logging may occur continuously or periodically throughout execution of a lesson plan as additional aircraft data, head position data, and/or audio data is received. The collection of information logged during a pilot training session may be referred to as a "flight log." In order to facilitate later correlation of the flight log data with the state of the lesson plan, the processing system may associate and store marker information (e.g., a time and/or event marker) with each item of information logged and/or with a set of information.

The processing subsystem also may evaluate the received aircraft data, head position data, and/or audio data in conjunction with the software instructions being executed. An evaluation of received aircraft data may include, for example, comparing a value of the received aircraft data to a threshold to determine whether or not the aircraft data value is above, equal to or below the threshold (e.g., comparing an airspeed data value to a stalling speed threshold). Alternatively, an evaluation of received aircraft data may include determining a setting of a control component or a state of an instrument (e.g., determining a flap setting or a fuel level). Evaluating head position data may include, for example, determining whether the pilot's head is facing in a particular direction (e.g., toward an instrument that the pilot should be viewing), and/or determining whether the pilot's head is moving, determining a range of motion of the pilot's head (e.g., whether the pilot is looking at all instruments and/or out all windows).

Evaluation of audio data may include, for example, determining whether the pilot is communicating over the radio and/or whether the aircraft is receiving radio transmissions.

In block 606, a determination may be made whether or not a display indicator is warranted based on the software instructions being executed and/or the evaluation of the aircraft data and head position data. In some cases, a determination may be made that multiple display indicators are warranted, although display of only a single display indicator is discussed below for simplicity. For example, certain software instructions, when executed, may cause the processing subsystem automatically to generate a particular display indicator. Alternatively, certain software instructions, when executed, may include an evaluation of the aircraft data and/or head position data in conjunction with a threshold, a setting, or another measurable characteristic, as indicated above. When the evaluation indicates an out-of-range condition (e.g., a value of an aircraft data item is above or below a threshold), an incorrect setting, or some other characteristic, a determination may be made that a display indicator is warranted. When a determination is made that a display indicator is not warranted, the method proceeds to block 612, which will be described in more detail later.

When a determination is made that a display indicator is warranted, then in block 608, the processing subsystem causes the appropriate display indicator to be generated on the display panel of the near-eye display (e.g., near-eye display 144, FIG. 1). As discussed previously, display indicators may include, but are not limited to, interior display indicators (e.g., display indicators positioned on the display panel in proximity to the instrument panel or control components, such as instrument indicators and control component indicators) and exterior display indicators (e.g., display indicators positioned on the display panel to overlie areas that correspond to the windshield or other windows).

In order to generate the display indicator, the processing subsystem may access aircraft specific layout information from a memory device (e.g., memory device 122, FIG. 1). As discussed previously, aircraft specific layout information may include information that specifies the physical layout of the aircraft instruments, control components, windshield, and/or windows for a given aircraft. In an embodiment, to determine the location of the display indicator on the display panel of the near-eye display, the processing subsystem may determine a default location of the display indicator on the display panel based on the location of the instrument, control component, or other feature as specified by the aircraft specific layout information. The processing subsystem may then determine the position and orientation of the pilot's head based on the head position data, and may determine a location on the display panel as the default location offset along one or two axes to compensate for the pilot's head position and head orientation. In other words, the processing subsystem determines the location of the display indicator on the display panel as the location in proximity to or overlying the instrument, control component, or other feature, taking into account the position and orientation of the pilot's head. The processing subsystem may send a signal, via a near-eye display interface (e.g., near eye display interface 154, FIG. 1), to a display driver associated with the near-eye display, which indicates the location and the configuration of the display indicator on the display panel. The display driver may then generate the display indicator on the display panel.

In block 610, the processing subsystem dynamically re-generates the display indicator by dynamically changing the location of the display indicator on the display panel as the pilot's head changes position and/or orientation. In an embodiment, the processing subsystem continues to receive additional head position data from the head position sensing system, and the processing system dynamically determines updated locations of the display indicator based on changes in the pilot's head position and/or head orientation. The processing subsystem generates and sends additional display signals to the display driver, which causes the near-eye display to display the display indicator in the updated locations. In this manner, the display indicator will appear to remain in proximity to (e.g., overlying) the instrument, control component or other feature as the pilot changes his head position and/or orientation. For any given display indicator, block 610 will continue to be performed until a determination is made (not illustrated) that the display indicator is no longer warranted. At that time, the processing subsystem may discontinue sending signals to the display driver for the given display indicator, and it will be removed from the display panel.

In block 612, a determination may be made whether or not an audio prompt is warranted based on the software instructions being executed and/or the evaluation of the aircraft data and/or head position data. For example, certain software instructions, when executed, may cause the processing subsystem automatically to generate an audio prompt. Alternatively, certain software instructions, when executed, may include an evaluation of the aircraft data and/or head position data in conjunction with a threshold, a setting, or another measurable characteristic, as indicated above. When the evaluation indicates an out-of-range condition (e.g., a value of an aircraft data item is above or below a threshold), an incorrect setting, or some other characteristic, a determination may be made that an audio prompt is warranted. When a determination is made that an audio prompt is not warranted, the method proceeds to block 616, which will be described in more detail later.

When a determination is made that an audio prompt is warranted, then in block 614, the processing subsystem causes an appropriate audio prompt to be provided to the headphones (e.g., headphones 146, FIG. 1) via a headphone interface (e.g., headphone interface 156, FIG. 1). An audio prompt may correspond to a display indicator that is currently being displayed, although an audio prompt alternatively may be independent from the display indicator. For example, when a display indicator is being displayed in proximity to the altimeter in order to direct the pilot's attention to that instrument, an audio prompt such as "look at the altimeter" may be output. Digital representations of audio prompts may be retrieved from a memory device (e.g., memory device 122, FIG. 1), and may include, for example, reminders to the pilot to look at certain instruments, control components or other features (e.g., the horizon, a runway centerline, and/or other aircraft), to check or change a setting of a control instrument, and/or to take some other action. In an alternate embodiment, the processing subsystem may cause textual representations of such audio prompts to be displayed on the display panel.

As discussed previously, any or all of blocks 602-614 may be performed zero or more times within a particular lesson plan state. In an embodiment, a determination may be made, in block 616, whether a particular lesson plan state has been completed. This determination may be made, for example, at the conclusion of execution of the software instructions associated with the state. Alternatively, this determination may be made when a particular lesson plan state has been aborted (e.g., an aborted takeoff). When a lesson plan state has not been completed, the method iterates as shown. When a lesson plan state has been completed, then in block 617, additional lesson plan state information may be logged or stored (e.g., in memory device 122, FIG. 1). For example, the additional lesson plan state information may include an indication of results of execution of the lesson plan state (e.g., pilot compliance with the lesson plan, whether the lesson plan state was terminated before completion, and so on), and/or a representation of some or all aircraft data, head position data, and/or audio data that may have been received during execution of the lesson plan state, but which may not have been previously logged. In block 618, a determination may be made whether the last lesson plan state has been completed. When the last lesson plan state has not been completed, then in block 620, the on-board lesson plan execution system transitions to the next lesson plan state (e.g., pre-flight inspection state 502, FIG. 5) by loading and beginning executing software instructions corresponding to the next lesson plan state. When the last lesson plan state has been completed, then the method may end. This corresponds to the end of the pilot training session.

FIG. 7 is a flowchart of a method for retrieving and evaluating flight log data, according to an example embodiment. The flight log evaluation application, when executed, enables a user (e.g., a flight instructor) to cause a computer (e.g., computer 102, FIG. 1) to render all or portions of the corresponding flight based on flight log data stored during the flight. The method may begin, in block 702, by retrieving flight log data from an on-board lesson plan execution system (e.g., on-board lesson application system 104, FIG. 1) after conclusion of a flight. In an embodiment, the flight log data may be retrieved by inserting a removable storage media (e.g., CD ROM 110 or USB port-compatible removable storage device 112, FIG. 1) into a removable storage media interface (e.g., removable storage media interface 126, FIG. 1), and downloading flight log data stored during a flight onto the removable storage media. In an embodiment, when the removable storage media is inserted into the removable storage media storage interface, an on-board processing subsystem (e.g., on-board processing subsystem 120, FIG. 1) may automatically copy the flight log data stored in an on-board memory device (e.g., memory device 122, FIG. 1) onto the removable storage media. In an alternate embodiment, the on-board lesson plan execution system may include a user interface (e.g., a display and keyboard) that enable the user to control the download of the flight log data, rather than automatically downloading the flight log data when the removable storage media is inserted. In still another alternate embodiment, flight log data may be downloaded via a wireless connection between the on-board lesson plan execution system and a remote storage media within which flight log data will be stored. Once the flight log data is downloaded, the removable storage media may then be inserted into a computer (e.g., computer 102, FIG. 1) to enable the flight log data to be accessed by a flight log evaluation application.

In block 704, the flight log evaluation application may be initiated. This may occur, in an embodiment, when a user (e.g., a flight instructor) selects the flight log evaluation application via a user interface of the computer, and initiates execution of an instance of the flight log evaluation application. In an embodiment, the flight log evaluation application, when initiated, may cause the computer to display a flight log evaluation window, which may include one or more menu options. Menu options may include, for example, selecting flight log data to be evaluated. In block 706, the flight log data may be loaded from the removable storage media to the computer. Alternatively, the flight log data may be accessed directly from the removable storage media.

In block 708, all or portions of the flight that corresponds to the flight log data may be rendered by the flight log evaluation application. Rendering the flight may include, for example, displaying a representation of the cockpit layout based on aircraft specific information for the particular aircraft. In addition, rendering the flight may include evaluating the flight log data to display a timer or other indication of the section of the flight being rendered based on marker information in the flight log data, displaying indications of the state or settings of various instruments and control components based on logged aircraft data, overlying display indicators on the displayed representation of the cockpit layout that were displayed during the flight, outputting audio that indicates audio prompts that were played during the flight, and/or outputting pilot utterances and/or radio transmissions made during the flight based on logged audio data. In an embodiment, via user interface inputs, a user may cause the rendering of the flight to start (e.g., from the beginning or from an intermediate point), may pause the rendering of the flight, and/or may cease rendering the flight. When rendering of the flight has been completed, the method may end.

Rendering a flight using embodiments described herein may enable a user to obtain detailed information regarding a pilot's compliance with a lesson plan and/or areas in which the pilot appears to be competent or in need of further instruction. This may enable a flight instructor and a pilot to focus more attention on those areas in which the pilot needs further instruction, and thus may reduce the number of training hours to achieve the training objectives of a lesson plan or training program. In addition, the display indicators and audio prompts that may be provided to a pilot during the flight may further expedite the pilot's competence in particular areas of instruction. Accordingly, embodiments discussed herein may enable pilots to achieve competencies necessary for particular certifications in shorter periods of time than are expended using traditional pilot training techniques.

Embodiments of pilot training methods and systems have now been described. An embodiment includes a system for assisting an operator of an apparatus that includes a control compartment. The system includes a near-eye display and a processing subsystem. The near-eye display includes a transparent display panel and is adapted to be worn on a head of the operator. The processing subsystem is communicatively coupled to the near-eye display, and is adapted to receive layout information defining a physical layout of one or more operational components located within the control compartment. The processing subsystem is further adapted to determine a location for a display indicator on the transparent display panel, where the location is determined to appear to the operator to be in proximity to an operational component of the one or more operational components, and the processing subsystem is further adapted to generate a display signal to cause the near-eye display to display the display indicator in the location.

A further embodiment includes a head position sensing system communicatively coupled to the processing subsystem and adapted to generate head position data representing a head position and a head orientation of the operator. In the further embodiment, the processing subsystem is further adapted to receive the head position data and to determine the location of the display indicator as a default location that is offset to compensate for the head position and the head orientation. In yet a further embodiment, at least a portion of the system is incorporated into the apparatus, and the apparatus is an apparatus selected from a group that includes an airplane, a simulator, a helicopter, a gyroplane, a glider, an electric vehicle, a hybrid vehicle, a motor vehicle, and a water vessel.

Another embodiment includes a system for assisting a pilot of an aircraft that includes a cockpit. The system includes a near-eye display and a processing subsystem. The near-eye display includes a transparent display panel, and is adapted to be worn on a head of the pilot. The processing subsystem is communicatively coupled to the near-eye display, and is adapted to receive layout information defining a physical layout of one or more operational components located within the cockpit. The processing subsystem is further adapted to determine a location for a display indicator on the transparent display panel, where the location is determined to appear to the pilot to be in proximity to an operational component of the one or more operational components, and the processing subsystem is further adapted to generate a display signal to cause the near-eye display to display the display indicator in the location.

A further embodiment includes a head position sensing system communicatively coupled to the processing subsystem and adapted to generate head position data representing a head position and a head orientation of the pilot. In the further embodiment, the processing subsystem is further adapted to receive the head position data and to determine the location of the display indicator as a default location that is offset to compensate for the head position and the head orientation. In yet a further embodiment, the head position sensing system is further adapted to generate additional head position data, and the processing system is further adapted to receive the additional head position data, to determine updated locations of the display indicator, and to generate additional display signals to cause the near-eye display to display the display indicator in the updated locations. Yet a further embodiment includes a memory device within which software instructions are stored, where the processing system is adapted to execute the software instructions, and where execution of the software instructions includes determining whether to display the display indicator. Yet a further embodiment includes a computer adapted to execute an application with which the software instructions may be generated through interaction with a user. Yet a further embodiment includes an aircraft data interface communicatively coupled to the processing subsystem, where the processing system is adapted to receive aircraft data through the aircraft data interface, and where the aircraft data includes information that indicates states of aircraft components, and where the processing subsystem is adapted to perform an evaluation of the aircraft data to determine whether to display a display indicator. Yet a further embodiment includes a memory device, where the processing subsystem is further adapted to generate a flight log by storing a representation of at least some of the aircraft data with corresponding marker information in the memory device. Yet a further embodiment includes a computer adapted to execute an application with which the flight log may be evaluated through interaction with a user in order to render a flight during which the flight log was generated.

Another embodiment includes a method for assisting an operator of an apparatus that includes a control compartment. The method includes the steps of receiving layout information defining a physical layout of one or more operational components located within the control compartment, determining a location for a display indicator on a transparent display panel of a near-eye display, where the location is determined to appear to the operator to be in proximity to an operational component of the one or more operational components, and causing the near-eye display to display the display indicator in the location.

A further embodiment also includes the steps of generating head position data representing a head position and a head orientation of the operator, and determining the location of the display indicator as a default location that is offset to compensate for the head position and the head orientation. A further embodiment also includes the steps of generating additional head position data, determining an updated location of the display indicator, and causing the near-eye display to display the display indicator in the updated location. A further embodiment also includes the step of outputting an audio prompt corresponding to the display indicator. In a further embodiment, the apparatus is an aircraft, and the method further includes the steps of receiving aircraft data that includes information that indicates states of aircraft components, and performing an evaluation of the aircraft data to determine whether to cause a display indicator to be displayed. In a further embodiment, the step of determining the location includes determining a location in proximity to an aircraft instrument or a control component. In a further embodiment, the step of determining the location includes determining a location overlying a windshield or window. A further embodiment also includes the step of generating a flight log by storing a representation of at least some of the aircraft data with corresponding marker information. A further embodiment also includes the step of rendering, on a computer, a flight during which the flight log was generated.

Embodiments of the above-described systems and methods may provide one or more advantages over traditional systems and methods. For example, using embodiments of the inventive subject matter, the number of training hours required to produce certifiable pilots may be reduced, when compared with traditional pilot training programs, thus reducing the overall cost of a training program. The various embodiments described above have been described herein in terms of functional block components and various processing steps. It should be appreciated that such functional blocks may be realized by any number of hardware, firmware, and/or software components configured to perform the specified functions. For example, the embodiments may employ various integrated circuit components (e.g., memory elements, digital signal processing elements) which may carry out a variety of functions under the control of one or more microprocessors or other control devices. Such general techniques and components that are known to those skilled in the art are not described in detail herein.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment. It being understood that various changes may be made in the function and arrangement of elements described in an exemplary embodiment without departing from the scope of the inventive subject matter as set forth in the appended claims.

What is claimed is:

1. A system for assisting an operator of an apparatus that includes a control compartment, the system comprising:
   a near-eye display having a transparent display panel, wherein the near-eye display is adapted to be worn on a head of the operator; and
   a processing subsystem communicatively coupled to the near-eye display, wherein the processing subsystem is adapted to receive layout information defining a physical layout of one or more operational components located within the control compartment, to determine a location for displaying a display indicator on the transparent display panel in proximity to an operational component based on the layout information, wherein the display indicator is selected from a group consisting of an instrument indicator and a control component indicator, and and to generate a display signal to cause the near-eye display to display the display indicator at the location in proximity to the operational component without significantly obscuring the control compartment from view of the operator through the transparent display panel.

2. The system of claim 1, further comprising:
a head position sensing system communicatively coupled to the processing subsystem and adapted to generate head position data representing a head position and a head orientation of the operator,
wherein the processing subsystem is further adapted to receive the head position data and to determine the location of the display indicator as a default location that is offset to compensate for the head position and the head orientation.

3. The system of claim 1, wherein at least a portion of the system is incorporated into the apparatus, and the apparatus is an apparatus selected from a group that includes an airplane, a simulator, a helicopter, a gyroplane, a glider, an electric vehicle, a hybrid vehicle, a motor vehicle, and a water vessel.

4. The system of claim 1, wherein the one or more operational components include one or more components selected from a group consisting of an altimeter, an attitude indicator, a fuel gage, a yoke, an ignition, a throttle, a flap lever, a brake, and a rudder pedal.

5. A system for assisting a pilot of an aircraft that includes a cockpit, the system comprising:
a near-eye display having a transparent display panel, wherein the near-eye display is adapted to be worn on a head of the pilot; and
a processing subsystem communicatively coupled to the near-eye display, wherein the processing subsystem is adapted to receive layout information defining a physical layout of one or more operational components located within the cockpit, and to determine a location for displaying a display indicator on the transparent display panel in proximity to an operational component based on the layout information, wherein the display indicator is selected from a group consisting of an instrument indicator and a control component indicator, and to generate a display signal to cause the near-eye display to display the display indicator at the location in proximity to the operational component without significantly obscuring the control compartment from view of the operator through the transparent display panel.

6. The system of claim 5, further comprising:
a head position sensing system communicatively coupled to the processing subsystem and adapted to generate head position data representing a head position and a head orientation of the pilot,
wherein the processing subsystem is further adapted to receive the head position data and to determine the location of the display indicator as a default location that is offset to compensate for the head position and the head orientation.

7. The system of claim 6, wherein the head position sensing system is further adapted to generate additional head position data, and the processing system is further adapted to receive the additional head position data, to determine updated locations of the display indicator, and to generate additional display signals to cause the near-eye display to display the display indicator in the updated locations.

8. The system of claim 6, further comprising:
a memory device within which software instructions are stored, wherein the processing system is adapted to execute the software instructions, and wherein execution of the software instructions includes determining whether to display the display indicator.

9. The system of claim 8, further comprising:
a computer adapted to execute an application with which the software instructions are generated through interaction with a user.

10. The system of claim 6, further comprising:
an aircraft data interface communicatively coupled to the processing subsystem, wherein the processing system is adapted to receive aircraft data through the aircraft data interface, and wherein the aircraft data includes information that indicates states of aircraft components, and wherein the processing subsystem is adapted to perform an evaluation of the aircraft data to determine whether to display a display indicator.

11. The system of claim 10, further comprising:
a memory device, wherein the processing subsystem is further adapted to generate a flight log by storing a representation of at least some of the aircraft data with corresponding marker information in the memory device.

12. The system of claim 11, further comprising:
a computer adapted to execute an application with which the flight log may be evaluated through interaction with a user in order to render a flight during which the flight log was generated.

13. The system of claim 5, wherein the one or more operational components include one or more components selected from a group consisting of an altimeter, an attitude indicator, a fuel gage, a yoke, an ignition, a throttle, a flap lever, a brake, and a rudder pedal.

14. A method for assisting an operator of an apparatus that includes a control compartment, the method comprising the steps of:
receiving, via a processor, layout information defining a physical layout of one or more operational components located within the control compartment;
determining, via the processor, a location for displaying a display indicator on a transparent display panel of a near-eye display in proximity to an operational component based on the layout information, wherein the display indicator is selected from a group consisting of an instrument indicator and a control component indicator; and
generating, via the processor, a display signal to cause the near-eye display to display the display indicator at the location in proximity to the operational component without significantly obscuring the control compartment from view of the operator through the transparent display panel.

15. The method of claim 14, further comprising:
generating head position data representing a head position and a head orientation of the operator; and
determining the location of the display indicator as a default location that is offset to compensate for the head position and the head orientation.

16. The method of claim 15, further comprising:
generating additional head position data;
determining an updated location of the display indicator; and
causing the near-eye display to display the display indicator in the updated location.

17. The method of claim 14, further comprising:
outputting an audio prompt corresponding to the display indicator.

18. The method of claim 14, wherein the apparatus is an aircraft, and the method further comprises:
receiving aircraft data that includes information that indicates states of aircraft components; and
performing an evaluation of the aircraft data to determine whether to cause a display indicator to be displayed.

19. The method of claim 18, wherein determining the location comprises determining a location in proximity to an aircraft instrument or a control component.

20. The method of claim 18, wherein determining the location comprises determining a location overlying a windshield or window.

21. The method of claim 18, further comprising:
generating a flight log by storing a representation of at least some of the aircraft data with corresponding marker information.

22. The method of claim 21, further comprising:
rendering, on a computer, a flight during which the flight log was generated.

23. The method of claim 14, wherein the one or more operational components include one or more components selected from a group consisting of an altimeter, an attitude indicator, a fuel gage, a yoke, an ignition, a throttle, a flap lever, a brake, and a rudder pedal.

24. The method of claim 14, wherein the instrument indicator is an indicator of an aircraft instrument selected from a group consisting of an altimeter, an attitude indicator, and a fuel gage.

25. The method of claim 14, wherein the control component indicator is an indicator of an aircraft control component selected from a group consisting of a yoke, an ignition, a throttle, a flap lever, a brake, and a rudder pedal.

26. The method of claim 14, wherein the location is a location that overlies an instrument panel of the apparatus.

* * * * *